(12) United States Patent
Testu et al.

(10) Patent No.: US 10,948,679 B2
(45) Date of Patent: Mar. 16, 2021

(54) METHOD OF SZ STRANDING FLEXIBLE MICROMODULES

(71) Applicant: DRAKA COMTEQ BV, Amsterdam (NL)

(72) Inventors: Jean-Marc Testu, Paron (FR); Jean-Pierre Bonicel, Paron (FR); Olivier Tatat, Paron (FR)

(73) Assignee: DRAKA COMTEQ BV, Amsterdam (NL)

( * ) Notice: Subject to any disclaimer, the term of this patent is extended or adjusted under 35 U.S.C. 154(b) by 123 days.

(21) Appl. No.: 15/558,418

(22) PCT Filed: Apr. 9, 2015

(86) PCT No.: PCT/IB2015/000622
§ 371 (c)(1),
(2) Date: Sep. 14, 2017

(87) PCT Pub. No.: WO2016/162715
PCT Pub. Date: Oct. 13, 2016

(65) Prior Publication Data
US 2018/0088294 A1 Mar. 29, 2018

(51) Int. Cl.
*G02B 6/44* (2006.01)
*D07B 3/00* (2006.01)

(52) U.S. Cl.
CPC ............ *G02B 6/449* (2013.01); *D07B 3/005* (2013.01); *G02B 6/4413* (2013.01);
(Continued)

(58) Field of Classification Search
CPC ...... G02B 6/4413; G02B 6/449; D07B 3/005; D07B 2201/1088; D07B 2201/2096
See application file for complete search history.

(56) References Cited

U.S. PATENT DOCUMENTS 3,367,097 A * 2/1968 Menasoff ........... H01B 13/0242
57/294
3,491,525 A * 1/1970 Masao ............... H01B 13/0235
57/294
(Continued)

FOREIGN PATENT DOCUMENTS

DE 3839816 A1 10/1989
EP 0424151 A2 4/1991
(Continued)

OTHER PUBLICATIONS

International Preliminary Report on Patentabifty for PCT/IB2015/000622 dated Oct. 10, 2017 (5 pages).
(Continued)

*Primary Examiner* — Khoa D Huynh
*Assistant Examiner* — Uyen T Nguyen
(74) *Attorney, Agent, or Firm* — Shumaker, Loop & Kendrick, LLP (57) ABSTRACT

The invention concerns a method of SZ stranding into one strand a bundle of two or more flexible micromodules, each micromodule comprising one or more optical fibers. A first pulley is located with its winding surface adjacent to a longitudinal axis of a cabling line. The bundle of micromodules is guided over the winding surface of the first pulley, the first pulley being rotating around the longitudinal axis of the cabling line. The rotational speed, or the rotational direction of the first pulley, is alternating.

15 Claims, 4 Drawing Sheets

(52) U.S. Cl.
CPC ............... *D07B 2201/1088* (2013.01); *D07B 2201/2096* (2013.01); *D07B 2207/4018* (2013.01)

(56) References Cited

U.S. PATENT DOCUMENTS

| | | | | |
|---|---|---|---|---|
| 3,507,108 | A | * | 4/1970 | Masamichi ........ H01B 13/0235 57/294 |
| 3,771,304 | A | * | 11/1973 | Taketomi ................. D07B 7/08 57/58.57 |
| 4,192,127 | A | * | 3/1980 | O'Neil ................... D07B 5/005 57/228 |
| 4,266,398 | A | * | 5/1981 | Vogelsberg ............ H01B 13/04 57/293 |
| 4,493,182 | A | * | 1/1985 | Vogelsberg ............ H01B 13/04 57/100 |
| 4,744,935 | A | * | 5/1988 | Priaroggia ............. G02B 6/449 264/103 |
| 5,102,584 | A | * | 4/1992 | Paivinen .............. G02B 6/4484 264/1.28 |
| 6,615,571 | B1 | * | 9/2003 | Okada .................. G02B 6/4491 57/6 |
| 6,853,780 | B1 | * | 2/2005 | Brandi .................. G02B 6/443 385/103 |

FOREIGN PATENT DOCUMENTS

| | | | |
|---|---|---|---|
| EP | 1200864 B1 | 8/2008 | |
| FR | 2419349 A1 | * 10/1979 | ............. D07B 3/005 |
| GB | 1489918 A | * 10/1977 | ............. D07B 3/005 |
| WO | 1999/063147 A1 | 9/1999 | |

OTHER PUBLICATIONS

International Search Report for PCT/IB2015/000622 dated Dec. 7, 2015 (2 pages).

* cited by examiner

METHOD OF SZ STRANDING FLEXIBLE MICROMODULES

TECHNICAL FIELD

The present invention relates generally to the field of optical fibers stranding machinery.

In particular, the invention relates to a technique for SZ stranding flexible micromodules comprising one or more optical fibers.

BACKGROUND

Optical fibers are used to transmit information over longer distances and at higher bandwidths than traditional electrical wire cables.

They are increasingly designed to have low friction properties and flexibility to be pushed, pulled, bent, branched, and handled in ways that allow easy manipulation for installation, without reductions in loss or damage to the optical core.

Optical fibers are generally used in the form of optical fiber cables, for a wide range of indoor and outdoor activities, for example in long distance telecommunication field, high-speed data connection, or civil engineering sector.

According to their use, optical fiber cables can be assembled differently. However, all cables substantially have a similar structure: an outer sheath comprising an optical core made of several micromodules, each micromodule being itself made of one or several optical fibers surrounded by thin and flexible sheaths of polymeric material. Such a structure protects fibers from outdoor humidity and environmental hazards (construction works, gnawing animals, etc.).

Two categories of optical cores can be designed, depending on the way micromodules are arranged in relation to each other. On the one hand, helical (or ZS/SZ) stranded core; on the other hand, non-helical (or parallel) stranded core, corresponding to modules that are not winded up into a common strand.

In this document, a particular focus is placed on SZ stranded micromodules. SZ stranding, also referred to as reverse oscillating lay (ROL), is well known by persons skilled in the art. In SZ stranding, a bundle of micromodules is first twisted in a clockwise direction for a predetermined number of twists. Then, twisting direction changes, and the bundle of micromodules is twisted in a counter-clockwise direction for another predetermined number of twists. Then again, twisting direction changes back to the clockwise direction, and so on.

Figure 1:
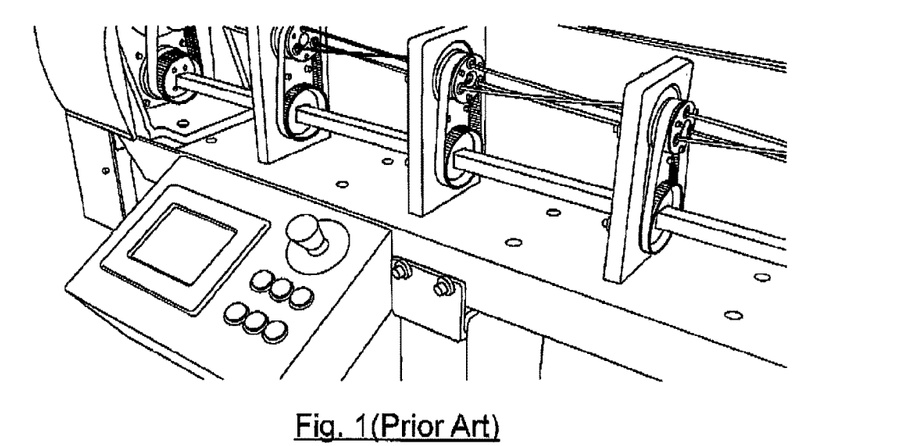
FIG. 1 is a picture of a SZ stranding machinery from prior art.

Prior art SZ stranding cabling lines comprise several successive oscillating plates, called dies, through which the micromodules are inserted, at set-up stage, as presented in FIG. 1. Such stranding SZ machines comprise a range of dies, which rotate at different speeds to organize the SZ stranding. Micromodules first go through the set of dies and then through the motor, which rotates the dies. The SZ strand is formed at the output of the motor.

However, one major drawback of these traditional SZ stranding devices is the fact that machinery extends for several meters long (typically four to six meters), requiring space in the manufacturing plant and limiting the longitudinal stranding speed.

Moreover, at set-up stage, an operator has to pass each micromodule through an appropriate opening in each die of the SZ stranding line: as a result, set-up time is long, especially for a cable with 24 micromodules or more. Besides, there is a risk that micromodules be inserted in wrong openings.

Such stranding devices also have the drawback not to maintain a constant tension in micromodules, and thus in optical core, along the cabling line. Tension varies widely between straight-line state of micromodules and their S or Z twisted state.

Finally, it can be underlined that the increase of tension in the optical core, due to accumulation of friction efforts in the different dies, creates an unwanted de-cabling SZ effect in the cable.

Consequently, there is a need for improving optical fibers SZ stranding process, in order to save time enabling high production speed and reduced set-up times, save space in the manufacturing plant, and consequently save money.

Patent document WO 99/63147 discloses a twist setting unit wherein a twisted cable is guided around spaced pulleys mounted in an opening in the twist setting unit. Pulleys are tilted at an angle to the axis of rotation of the unit to prevent contact of the overlapping sections of cable while setting the twist in the cable.

However, this document does not concern SZ stranding. Here, pulleys are used as over twisters for removing torsional residual forces. They are tilted relative to the axis of rotation. Consequently, they are not appropriate for operating at high line speeds as needed in optical fibers SZ cabling.

Patent document U.S. Pat. No. 3,771,304 discloses a twisting machine and process for producing wire cords particularly suitable for use in reinforcement of vehicle tires and other various articles of rubber or plastics. An over twister is provided between a rotating double twister adapted to twist together a plurality of wire elements, including pre-twisted wires, and a stationary take up means. The over twister consists of rollers turning about a path of travel of the twisted wire cord in the counter direction to the rotation of the double twister at a speed of revolution sufficient so as to convert at least part of the elastic strain in the wire elements which has been imparted by the double twister, to a corresponding permanent torsional strain, thereby improving the straightness of the finished wire cord and minimizing the tendency of the wire cord to become untwisted and curled as well as enabling higher speed production of twisted wire cords.

Pulleys, and particularly the over twister, are used for steel cord and other high elasticity materials, for removing torsional residual forces. Here again, such a twisting machine is not suited for optical fibers SZ stranding. Actually, optical fibers have peculiar constraints, as compared to wire or steel cords. First, optical fibers have very limited elasticity; secondly, during stranding of optical fibers, there are severe constraints, in order to keep within an acceptable range of increase in attenuation.

Patent document DE 38 39 816 discloses a stranding head for use in SZ-stranding machines. A slip-free rotation of the stranding elements to be stranded is generated, that is independent of the coefficient of friction. Such stranding head comprises a deflecting roller tangent to the axis of rotation of the stranding head, consisting of two grooved pulleys freely rotatable, independently of one another. Pulleys are oppositely and symmetrically arranged with respect to the axis of rotation, lying on a common perpendicular to the draw-off direction of the stranding elements.

Although such roller device is used for SZ stranding operations, the stranding head has two independent pulleys, which are located on the same axis. The lower and smaller pulley is tilted relative to the axis of rotation. This stranding head is thus not adequate for operating at high speeds. Moreover, two of such stranding heads are used in the stranding machinery.

There is a need to overcome the above-mentioned drawbacks of the prior art. More precisely, it would be desirable to provide SZ stranding machinery, which would be compact, easy-to-use, reliable, and working at high speed, to faster produce SZ-type optical cables.

SUMMARY

According to an embodiment of the invention, a new method of SZ stranding into one strand a bundle of at least two flexible micromodules is provided. A micromodule comprises at least one optical fiber. A first pulley is located with its winding surface adjacent to a longitudinal axis of a cabling line. The bundle of micromodules is guided over the winding surface of the first pulley, the first pulley being rotating around the longitudinal axis of the cabling line.

According to such a method of SZ stranding, the rotational speed of the first pulley, or the rotational direction of the first pulley, around said longitudinal axis, is alternating.

Using a pulley is an effective way to save space in the manufacturing plant, replacing traditional machinery of several meters long by a compact device. As the invention has no more oscillating plates (or dies), set-up time and risks of wrong manipulations are also highly reduced. A pulley-system permits to reach a longitudinal stranding speed that is impossible to reach with state-of-the-art solutions, such as the one disclosed in FIG. 1.

Productivity is consequently increased. This new method also avoids both problems of micromodules tension and de-cabling effect of existing SZ cabling lines.

According to another embodiment of the invention, a second pulley is located with its winding surface adjacent to the longitudinal axis of the cabling line, downstream the first pulley and on an opposite side of the longitudinal axis. The bundle of micromodules is first guided over the winding surface of the second pulley and subsequently guided over the winding surface of the first pulley, while the first and second pulleys are simultaneously rotating around the longitudinal axis of the cabling line.

Thus, risks are avoided to damage micromodules, or even break optical fibers arranged inside micromodules, because of micromodules overlapping around the pulley. Actually, with the use of two such pulleys, there is no module overlapping effect, and the SZ stranding is running well.

It must be understood that the rotation of both pulleys around the longitudinal axis of the cabling line is linked, and that they hence both rotate at the same speed and in the same direction.

According to a further embodiment, the rotational speed of the pulley(s) (either the sole pulley or both the first and second pulleys) alternates between a high speed and a lower speed.

According to a further embodiment, the speed difference between the high speed and the lower speed is set as a function of a required average pitch for the SZ stranding and of a cabling line speed.

According to yet a further embodiment, the rotation time at said high speed equals the rotation time at said lower speed. In other words, the pulley(s) rotate for the same amount of time at high speed and then at lower speed, and so on.

According to yet a further embodiment, the rotation time at high or low speed is set as a function of a required distance between SZ inversions and the cabling line speed.

According to an alternate embodiment, the rotational direction of the pulley(s) (either the sole pulley or both the first and second pulleys) around the longitudinal axis of the cabling line alternates between N turns clockwise and then N turns counter clockwise, and so on, with N an integer greater than 1. Alternating both directions of rotation alternates S and Z stranding, the value of N determining the SZ pitch.

According to a further embodiment, the pulley(s) stop(s) rotating for a predetermined amount of time between said N turns clockwise and said N turns counter clockwise. Accumulated S or Z stranded portions of the bundle of micromodules hence penetrate in the crosshead of the extruder.

The invention also concerns a device for SZ stranding into one strand a bundle of at least two flexible micromodules, each micromodule comprising at least one optical fiber. Such a device comprises:
 a first pulley, which is located with its winding surface adjacent to a longitudinal axis of a cabling line and which rotates around said longitudinal axis of the cabling line;
 means for guiding said bundle of micromodules over the winding surface of said first pulley.

Such a device also comprises means for alternating the rotational speed of said first pulley, or the rotational direction of said first pulley.

According to a further embodiment, such a device comprises a second pulley, which is located with its winding surface adjacent to the longitudinal axis of the cabling line, downstream the first pulley and on an opposite side of the longitudinal axis. The bundle of micromodules is first guided over the winding surface of the second pulley and subsequently guided over the winding surface of the first pulley, while the first and second pulleys are simultaneously rotating around said longitudinal axis of the cabling line.

According to yet a further embodiment, such a device comprises means for alternating the rotational speed of the pulley(s) between a high speed and a lower speed.

According to yet a further embodiment, such a device comprises means for alternating the rotational direction of the pulley(s) around said longitudinal axis between N turns clockwise and N turns counter clockwise, and so on, with N an integer greater than 1.

According to yet a further embodiment, the pulley(s) stop(s) rotating for a predetermined amount of time between said N turns clockwise and said N turns counter clockwise.

While not explicitly described, the present embodiments may be employed in any combination or sub-combination. Notably, it may be possible to alternate both the rotational speed and the rotational direction of the pulley(s). All features and advantages of the method of SZ stranding described above also apply to the device for SZ stranding.

BRIEF DESCRIPTION OF THE DRAWINGS

The invention can be better understood with reference to the following description and drawings, given by way of example and not limiting the scope of protection, and in which:

FIGS. 3A and 3B show a one-pulley SZ stranding device, during operation, according to a first embodiment of the invention:

FIG. 3A: pulley rotating around a first axis;

FIG. 3B: pulley rotating around a second axis;

FIGS. 5A and 5B show a two-pulley SZ stranding device, during operation, according to a second embodiment of the invention:

FIG. 5A: pulleys rotating around first axes;

FIG. 5B: pulleys rotating around a second axis;

DETAILED DESCRIPTION

Figure 2:
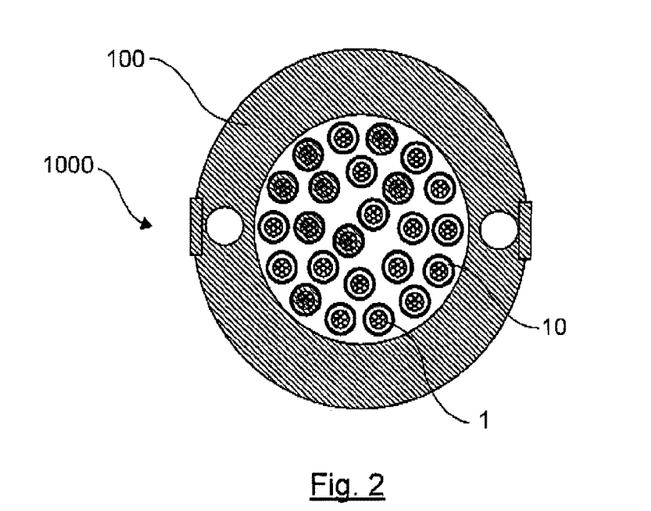
FIG. 2 depicts an exemplary structure of optical fiber cable, comprising an optical core made of several micromodules, each micromodule being made of several optical fibers.

The invention proposes a new approach to SZ stranding of micromodules made of optical fibers. Example of such micromodules is depicted in FIG. 2.

Several optical fibers 1 (from two to a hundred or more) are gathered together within a thin sheath of flexible polymeric material 10, herein referred to as micromodule. Micromodules 10 have a diameter of some millimetres, the thickness of the micromodule sheath being typically between 0.05 and 0.15 mm.

In order to constitute an optical fiber cable 1000, a batch of one to several tens of micromodules 10 is arranged within an outer sheath 100 of larger diameter, forming the optical core of the optical cable. Micromodules 10 are winded together by means of a SZ stranding device, before being jacketed with the outer sheath 100.

Embodiments of the invention mainly, but not exclusively, find application as regards soft modules with a diameter of around 1 mm, each comprising 2 to 12 optical fibers.

5.1 Description of a First Embodiment

Figure 3A:
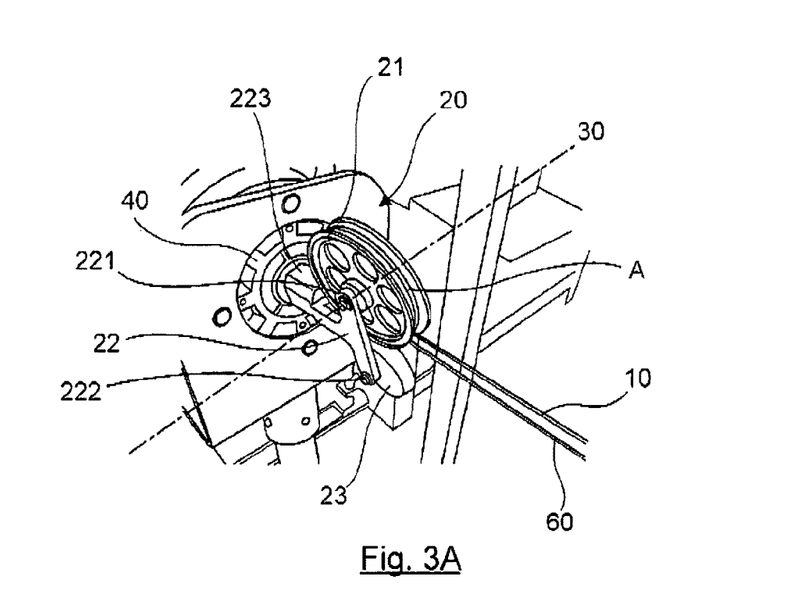
Figure 3B:
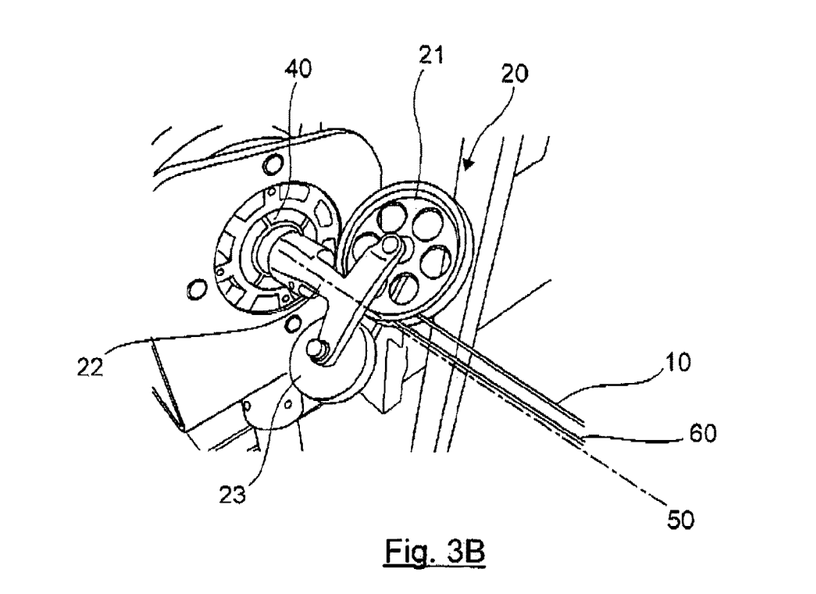
Figure 4:
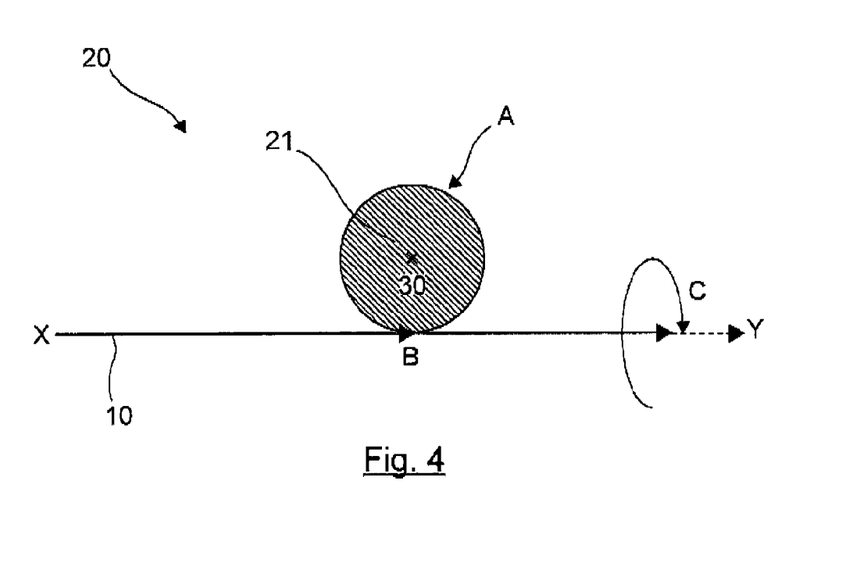
FIG. 4 is a schematic view of the one-pulley SZ stranding device, according to the first embodiment of the invention.

Referring now to FIGS. 3A, 3B and 4, we present a device for SZ stranding micromodules according to a first embodiment of the invention, and the corresponding SZ stranding method. In the manufacturing plant, such a device is part of a cabling line, which shows a longitudinal axis, corresponding substantially to the path followed by micromodules, from a feeding entry point where they are independent from each other, to an output point where they are gathered in a bundle to form an optical cable. In most manufacturing plants, such a longitudinal axis of the cabling line is substantially parallel to the ground.

FIGS. 3A and 3B show a SZ stranding device 20 comprising a single cylindrical pulley 21 rotationally mounted on a holder 22 in the form of a "T". In particular, this holder 22 has two opposite arms 221, 222: at the end of the first arm 221, pulley 21 is maintained at its central axis 30 (hereinafter referred to as "first axis 30"); at the end of the second arm 222, a counterweight 23 is attached. Holder 22 and counterweight 23 are preferably made of steel but other materials could be used. They may take any appropriate shape.

Holder 22 is fitted, via a third arm 223, to a motor 40, which rotates the holder 22 and the pulley 21 around a longitudinal axis 50 (hereinafter referred to as "second axis" 50). This motor is not described here, having similar characteristics as motors used in traditional SZ stranding lines.

Pulley 21 is characterized by its winding diameter, winding width and its rotational speed (or winding speed) (e.g. diameter 100 mm, width 15 mm, rotation speed depending on the line speed). Pulley 21 is advantageously made of steel, and perforated with regularly spaced holes, to alleviate it. It comprises a winding surface A, adapted to receive a bundle of several micromodules 10.

The winding surface A of pulley 21 is adjacent to the second axis 50.

As illustrated by FIG. 4, micromodules 10 (only one of which is illustrated on FIG. 4, for sake of simplification) travel along the cabling line, coming from the X direction, parallel to the second axis 50, and enter on pulley 21. They rotate around winding surface A of pulley 21, carrying out a complete rotation around pulley (see arrow B). Micromodules 10 exit pulley 21 and travel along the cabling line towards the Y direction, parallel to longitudinal axis 50.

Stranded micromodules are then introduced into the crosshead of the extruder (not represented on FIG. 4) and provided with the outside polymeric jacket of the cable. After cooling of the cable jacket, the jacket is submitted to a withdrawal movement that also draws the micromodules away from pulley.

An alternative method to keep the SZ stranded core is to use two small binders helically applied in two opposite directions on the stranded core. In such a case, the bound together bundle of micromodules is introduced into the crosshead of the extruder after the binding operation.

The cable may be provided with additional reinforcement such as steel or FRP (Fiber Reinforced Plastic) strength members in the polymeric jacket of the cable, and/or a steel tape comprised in the outer sheath of the cable.

A method of SZ stranding a bundle of these micromodules 10, implementing previously described SZ stranding device, is described below.

Before activating the stranding device, micromodules 10 are unwounded from a storing drum and wounded around pulley 21. The end of the bundle is fitted in the crosshead. When motor 40 is activated, two rotary movements of pulley 21 can take place.

On the one hand, micromodules are drawn away from pulley 21 by the cabling line, causing pulley 21 to rotate around first axis 30, and bundle of micromodules 10 to be guided over the winding surface A (see arrow B).

On the other hand, pulley 21 can rotate around second axis 50, causing micromodules to be twisted (see arrow C). Here, counterweight 23 permits to balance movement of pulley, and to avoid damaging motor 40. This rotary movement can be observed on FIG. 3A and FIG. 3B comparing change in pulley's position between the two figures.

Rotary movement of pulley 21 around longitudinal axis 50 is alternated, producing SZ stranded micromodules, which are then inserted in an outer sheath to form the optical core of an optical fiber cable.

To this purpose, the rotational direction of pulley 21 may be alternated, so that pulley 21 makes N turns right, or clockwise, around longitudinal axis 50, and then N turns left, or counter clockwise, around longitudinal axis 50, and so on. The number N of turns is chosen as a function of the pitch, which is targeted for the SZ stranded cable.

For example, if the required pitch is 200 mm, for a line speed of 100 m/min and a distance between sense inversion of 5 m, main parameters could approximately be: a clockwise (right) speed of 1500 turns/min; a counter clockwise (left) speed of 500 turns/min; rotating times of 1.5 s.

When pulley 21 rotates in a first rotational direction around longitudinal axis 50, bundle of micromodules 10 is S stranded. When pulley 21 rotates in a second rotational direction around longitudinal axis 50, bundle of micromodules 10 is Z stranded. Pulley 21 stops rotating for some time between each rotational movement, in order to let respective accumulated S and Z portions of the bundle penetrate in the crosshead, because of the withdrawal movement.

In an alternate embodiment, the rotary speed of pulley 21 around longitudinal axis 50 varies between high and low speeds. Once again, the values of the high and low speeds of pulley 21 are chosen as a function of the pitch that needs to be obtained for the SZ stranded cable.

For example, if the required pitch is 200 mm, for a line speed of 100 m/min and a distance between sense inversion of 5 m, main parameters could approximately be: a high speed of 1500 turns/min; a low speed of 500 turns/min; running times at low and high speeds of 1.5 s.

This compact one-pulley stranding device effectively replaces traditional stranding lines of several meters long. Set-up time and risks of wrong manipulations are considerably reduced as the operator only need to wind bundle of micromodules around pulley and attach it at its end. Micromodules are properly tensioned and variation of tension between straight state and stranded state is substantially low.

5.2 Description of a Second Embodiment

Figure 5A:
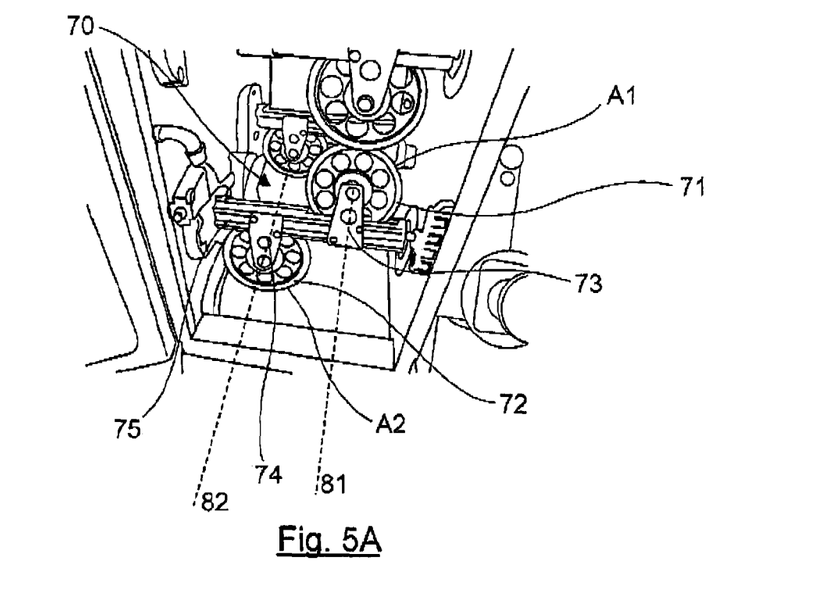
Figure 5B:
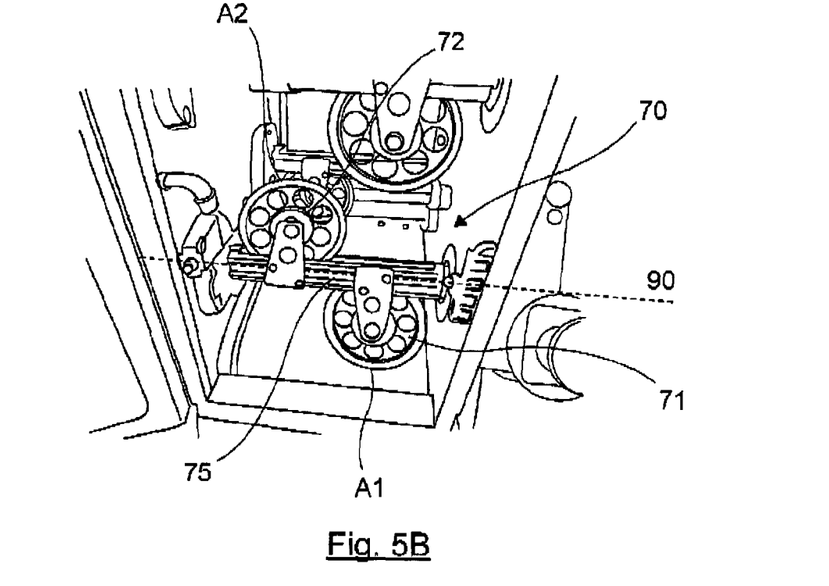
Figure 6:
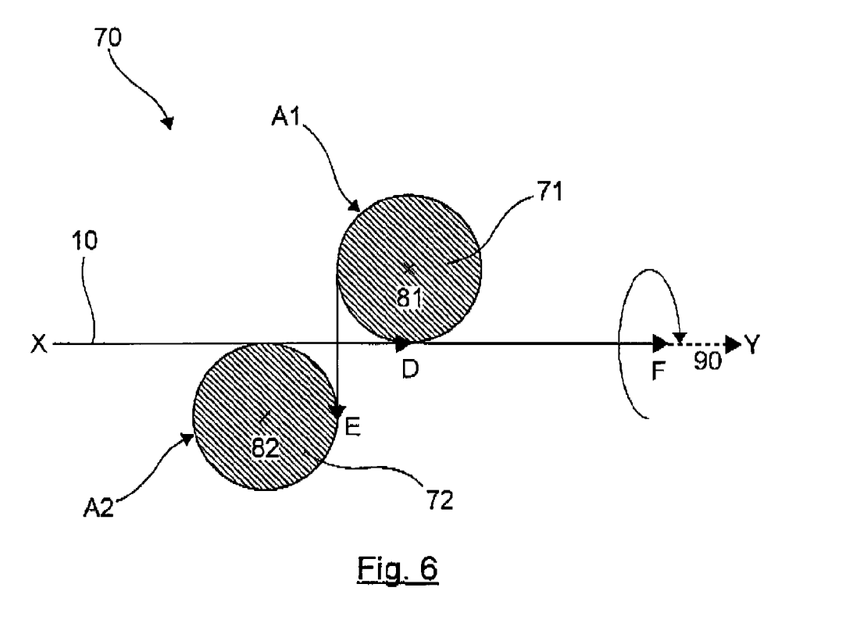
FIG. 6 is a schematic view of the two-pulleys SZ stranding device, according to the second embodiment of the invention.

Referring now to FIGS. 5A, 5B and 6, we present a second embodiment of the invention, implementing two pulleys 71, 72.

FIGS. 5A and 5B depict a SZ stranding device 70 comprising two cylindrical pulleys 71, 72 rotationally mounted on holders 73, 74 at their central axes 81, 82 (hereinafter referred to as "first axes 81, 82").

In this second embodiment, holders 73, 74 are fixedly attached to a hollow crossbar 75 within which circulates the bundle of micromodules 10 and a portion of each pulley 71, 72. A motor (not represented) rotates this crossbar 75, and consequently attached holders 73, 74 and pulleys 71, 72, around a longitudinal axis (hereinafter referred to as "second axis" 90).

In this second embodiment, pulleys 71, 72 have similar characteristics as single pulley 21 of the first embodiment. Each pulley comprises a winding surface A1, A2, adapted to receive the bundle of micromodules 10.

The winding surface A1 of first pulley 71 is located adjacent to the second axis 90 and the winding surface A2 of second pulley 72 is located adjacent to the second axis 90, upstream first pulley 71 and on an opposite side of second axis. Second axis 90 corresponds to the longitudinal axis of the cabling line to which the SZ stranding device belongs. Looking at FIGS. 5A and 5B, micromodules travel from left to right, so that second pulley 72 is located upstream first pulley 71, regarding the travelling direction of micromodules along the cabling line.

FIG. 6 diagrammatically depicts the two-pulleys SZ stranding device 70 and particularly shows trajectory of micromodules 10. Bundle of micromodules 10 comes from the X direction, travels parallel to second axis 90, and first enters first pulley 71 by its bottom left-hand side in the particular arrangement of FIG. 6. It winds around winding surface A1 of first pulley 71 counter clockwise, and travels three quarters of a complete rotation around first pulley (see arrow D).

Micromodules 10 then enter second pulley 72 on its upper right hand side in the particular arrangement of FIG. 6, winding clockwise around winding surface A2 of second pulley 72, carrying out three quarters of a complete rotation around second pulley (see arrow E).

Finally, micromodules 10 exit second pulley 72 on the side adjacent to the second axis 90 and travel parallel to second axis 90 towards the Y direction. In this embodiment, as in first embodiment of the invention, stranded micromodules are withdrawn from pulleys by the cabling line, before being introduced into the crosshead of the extruder.

Functioning of the two-pulleys stranding device 70 is substantially similar to the one-pulley stranding device 30. In this second embodiment, the two pulleys 71, 72 rotate simultaneously and in the same direction, so as to avoid micromodules 10 becoming slack. Pulleys 71, 72 can have two rotary movements.

On the one hand, micromodules are drawn away from pulleys 71, 72, causing both pulleys 71, 72 to rotate around first axes 81, 82 and micromodules 10 to be guided over the winding surface A1, A2 as detailed above (see arrows D and E).

On the other hand, pulleys 71, 72 can rotate around second axis 90, causing bundle of micromodules 10 to be twisted (see arrow F). This rotary movement can also be observed comparing position of pulleys in FIG. 5A and FIG. 5B.

In order to strand micromodules in a SZ configuration, the rotational speed of pulleys 71, 72 around the longitudinal axis 90 of the cabling line is alternating, whereas their rotational direction about longitudinal axis 90 is constant.

For example, the rotational speed of pulleys 71, 72 around longitudinal axis 90 alternates between a low speed and a higher speed. If the rotational direction is counter clockwise, at high speed more S turns are created whereas at low speed more Z turns are created. If the rotational direction is clockwise, at high speed more Z turns are created whereas at low speed more S turns are created. Thus, the pitch of the SZ stranding is determined by choosing appropriate high and low speeds. Low speed and high speed values, and particularly the gap between high and low speeds, are determined according to the required average pitch and the cabling line speed. The regularity of the pitch is adjusted according to the distance between pulleys 71, 72 and the crosshead.

Pulleys 71, 72 rotate during a certain time with low speed and during a certain time with high speed. These rotation times are substantially similar, and are chosen according to the required distance between SZ inversions and the cabling line speed.

For example, if the required distance between two SZ inversions is 5 m, and the average pitch is 250 mm, the cabling line speed being 100 m/min, running times at low and high speeds have to be 1.5 s, and the gap between low and high speeds has to be 800 turns/min (for example, 500 turns/min for low speed, and 1300 turns/min for high speed).

As another example, if the distance between sense inversion is 5 m, and the average pitch is 200 mm, with a line speed of 100 m/min, running times at low and high speeds could be 1.5 s, with a high speed of 1500 turns/min and a low speed of 500 turns/min.

If the line speed is reduced to 50 m/min without other parameters being changed, running times increase to 3 s, and the gap between low and high speeds decreases to 400 turns/min (for example, 250 turns/min for low speed, and 650 turns/min for high speed).

Alternating between higher and lower speeds also avoids micromodules becoming slack, which might occur when the rotational direction variates.

As an alternative, the rotational direction of pulleys 71, 72 around longitudinal axis 90 alternates: the set of both pulleys first rotates clockwise for N turns, and then rotates counter clockwise around longitudinal axis 90 for N turns. The pitch of the SZ stranding is determined by choosing an appropriate value for the number of turns N.

For example, for a pitch of 200 mm, a line speed of 100 m/min and a distance between sense inversion of 5 m, main parameters for pulleys 71, 72 could approximately be: a clockwise speed of 1500 turns/min; a counter clockwise speed of 500 turns/min; rotating times of 1.5 s.

More precisely, pulleys 71, 72 create Z assembly of micromodules 10 when rotating in a first direction, and S assembly of micromodules 10 when rotating in a second direction.

Pulleys 71, 72 stop rotating for some time before the rotational direction changes, in order to let respective accumulated S and Z portions of the bundle penetrate in the crosshead, because of the withdrawal movement.

It is also possible to both alternate rotational speed and rotational direction of the pulleys.

In this case, when pulleys 71, 72 rotate in a first direction, a certain length of Z stranded micromodules 10 goes through the crosshead and creates Z turns at the output of the crosshead. When pulleys 71, 72 rotate in a second direction, a certain length of S stranded micromodules 10 goes through the crosshead and creates S turns at the output of the crosshead. At high speed, more S turns are created, resulting in an S assembly. At low speed, more Z turns are created, resulting in a Z assembly.

The two-pulleys configuration of the SZ stranding device permits avoiding some hazards to damage micromodules, or even break optical fibers arranged inside micromodules. Indeed, with a single pulley, micromodules entering on pulley could overlap micromodules having already carried out one turn around the pulley.

SZ stranding device 70 is very compact, as it may be only 0.5 m long, as compared to a prior art stranding device, which is generally 4 to 6 meters long.

Although the present disclosure has been described with reference to one or more examples, workers skilled in the art will recognize that changes may be made in form and detail without departing from the scope of the disclosure and/or the appended claims.

The invention claimed is:

1. A method of SZ stranding into a one strand bundle at least two flexible micromodules, each micromodule comprising an optical fiber, the method comprising:
   providing a device configured to SZ strand the at least two flexible micromodules into the one strand bundle, the device having a longitudinal axis and a first and second pulley positioned along the longitudinal axis of the device;
   the first pulley is located with its winding surface adjacent to a longitudinal axis of a cabling line;
   the second pulley is located with its winding surface adjacent to said longitudinal axis of the cabling line, upstream said first pulley and on an opposite side of said longitudinal axis, and
   guiding the bundle of micromodules along a longitudinal axis of the device between the first and second pulley and winding the bundle of micromodules around the winding surface of said first pulley and subsequently guiding over and winding the bundle of micromodules around the winding surface of said second pulley, while said first and second pulleys are simultaneously rotating around said longitudinal axis of the cabling line, wherein:
   the rotational speed of said pulleys, or the rotational direction of said pulleys around said longitudinal axis, is alternating thereby forming the SZ stranded micromodules into the one strand bundle, and
   including holders attached to a hollow crossbar that position the first and second pulleys outside of the hollow crossbar such that the hollow crossbar is in between the first and second pulleys.

2. The method of claim 1, wherein the rotational speed of said pulleys is alternating between a high speed and a lower speed.

3. The method of claim 1, wherein the speed difference between said high speed and said lower speed is set as a function of a required average pitch for said SZ stranding and a cabling line speed.

4. The method of claim 1, wherein the rotation time of said pulleys at said high speed equals the rotation time of said pulleys at said lower speed.

5. The method of claim 1, wherein said rotation time is set as a function of a required distance between SZ inversions and a cabling line speed.

6. The method of claim 1, wherein the rotational direction of said pulleys around said longitudinal axis alternates between N turns clockwise and N turns counter clockwise, and so on, with N an integer greater than 1.

7. The method of claim 6, wherein said pulleys stop rotating for a predetermined amount of time between said N turns clockwise and said N turns counter clockwise.

8. A device for SZ stranding into a one strand bundle at least two flexible micromodules, each micromodule comprising an optical fiber, wherein it comprises:
   a first pulley, which is located with its winding surface adjacent to a longitudinal axis of a cabling line and which rotates around said longitudinal axis of the cabling line;
   a second pulley, which is located with its winding surface adjacent to said longitudinal axis of the cabling line, upstream said first pulley and on an opposite side of said longitudinal axis;
   a guide that guides said bundle of micromodules in between the first and second pulley along a longitudinal axis of the device, first over the winding surface of said first pulley, and subsequently over the winding surface of said second pulley, so that said bundle of micromodules winds around the winding surface of said first and second pulleys, while said first and second pulleys are simultaneously rotating around said longitudinal axis of the cabling line; and
   a motor configured to alternate the rotational speed of said pulleys, or the rotational direction of said pulleys to produce SZ stranded micromodules into the one strand bundle, and
   including holder attached to a hollow crossbar that position the first and second pulleys outside of the hollow crossbar such that the hollow crossbar is in between the first and second pulleys.

9. The device of claim 8, wherein said motor configured to alternate the rotational speed of said pulleys is configured to alternate said rotational speed between a high speed and a lower speed.

10. The device of claim 8, wherein said motor configured to alternate the rotational direction of said pulleys is configured to alternate said rotational direction around said longitudinal axis between N turns clockwise and N turns counter clockwise, and so on, with N an integer greater than 1.

11. The device of claim 10, wherein said pulleys stop rotating for a predetermined amount of time between said N turns clockwise and said N turns counter clockwise.

12. The method of claim 1, wherein each micromodule comprises a plurality of optical fibers arranged together within a micromodule sheath of flexible polymeric material.

13. The method of claim 12, wherein a thickness of each micromodule sheath including the plurality of optical fibers therein ranges from 0.05 to 0.15 mm in diameter.

14. The device of claim 8, wherein each micromodule comprises a plurality of optical fibers arranged together within a micromodule sheath of flexible polymeric material.

15. The device of claim 14, wherein a thickness of each micromodule sheath including the plurality of optical fibers therein ranges from 0.05 to 0.15 mm in diameter.

* * * * *